United States Patent
Lee et al.

(10) Patent No.: US 10,601,033 B2
(45) Date of Patent: Mar. 24, 2020

(54) HIGH-PERFORMANCE RECHARGEABLE BATTERIES HAVING A SPALLED AND TEXTURED CATHODE LAYER

(71) Applicant: International Business Machines Corporation, Armonk, NY (US)

(72) Inventors: Yun Seog Lee, Seoul (KR); Stephen W. Bedell, Wappingers Falls, NY (US); Joel P. de Souza, Putnam Valley, NY (US); Devendra K. Sadana, Pleasantville, NY (US)

(73) Assignee: International Business Machines Corporation, Armonk, NY (US)

(*) Notice: Subject to any disclaimer, the term of this patent is extended or adjusted under 35 U.S.C. 154(b) by 3 days.

(21) Appl. No.: 15/721,001

(22) Filed: Sep. 29, 2017

(65) Prior Publication Data

US 2019/0103626 A1    Apr. 4, 2019

(51) Int. Cl.
*H01M 4/36*  (2006.01)
*H01M 10/052*  (2010.01)
(Continued)

(52) U.S. Cl.
CPC ............ *H01M 4/366* (2013.01); *H01M 2/26* (2013.01); *H01M 2/30* (2013.01); *H01M 4/13* (2013.01); *H01M 4/139* (2013.01); *H01M 4/62* (2013.01); *H01M 4/628* (2013.01); *H01M 4/70* (2013.01); *H01M 10/00* (2013.01); *H01M 10/04* (2013.01);
(Continued)

(58) Field of Classification Search
CPC ..... H01M 10/0468; H01M 2/263; H01M 2/30
See application file for complete search history.

(56) References Cited

U.S. PATENT DOCUMENTS

| 4,888,259 A | 12/1989 | Ebner |
| 5,879,836 A | 3/1999 | Ikeda et al. |
(Continued)

FOREIGN PATENT DOCUMENTS

| CN | 102005597 A | 4/2011 |
| CN | 103283064 A | 9/2013 |
(Continued)

OTHER PUBLICATIONS

List of IBM Patents or Patent Applications Treated as Related dated Sep. 29, 2017, 2 pages.
(Continued)

*Primary Examiner* — Olatunji A Godo
(74) *Attorney, Agent, or Firm* — Scully, Scott, Murphy & Presser, P.C.; L. Jeffrey Kelly, Esq.

(57) ABSTRACT

A high-capacity and a high-performance rechargeable battery is provided by forming a rechargeable battery stack that includes a spalled material structure that includes a spalled cathode material layer that has at least one textured surface and a stressor layer that has at least one textured surface. The stressor layer serves as a cathode current collector of the rechargeable battery stack. The at least one textured surface of the spalled cathode material layer forms a large interface area between the cathode and electrolyte which is formed above the spalled cathode material layer. The large interface area between the cathode and the electrolyte reduces interface resistance within the rechargeable battery stack.

21 Claims, 4 Drawing Sheets

(51) Int. Cl.
*H01M 2/26* (2006.01)
*H01M 2/30* (2006.01)
*H01M 10/00* (2006.01)
*H01M 4/62* (2006.01)
*H01M 4/13* (2010.01)
*H01M 4/139* (2010.01)
*H01M 10/04* (2006.01)
*H01M 10/0585* (2010.01)
*H01M 4/70* (2006.01)
*H01M 10/058* (2010.01)
*H01M 10/42* (2006.01)
*H01M 10/0564* (2010.01)

(52) U.S. Cl.
CPC ....... *H01M 10/052* (2013.01); *H01M 10/058* (2013.01); *H01M 10/0585* (2013.01); *H01M 10/4235* (2013.01); *H01M 10/0564* (2013.01)

(56) References Cited

U.S. PATENT DOCUMENTS

| | | | |
|---|---|---|---|
| 7,192,673 B1* | 3/2007 | Ikeda | H01M 4/13 429/209 |
| 7,691,529 B2 | 4/2010 | Hennige et al. | |
| 8,247,261 B2 | 8/2012 | Bedell et al. | |
| 8,685,268 B1 | 4/2014 | Yee et al. | |
| 8,691,441 B2 | 4/2014 | Zhamu et al. | |
| 8,709,914 B2 | 4/2014 | Bedell et al. | |
| 8,748,296 B2 | 6/2014 | Bedell et al. | |
| 8,765,302 B2 | 7/2014 | Chen et al. | |
| 8,877,361 B2 | 11/2014 | Byun et al. | |
| 8,927,338 B1 | 1/2015 | Bedell et al. | |
| 8,999,553 B2 | 4/2015 | Anandan et al. | |
| 9,356,188 B2 | 5/2016 | Paranjpe et al. | |
| 9,502,609 B2 | 11/2016 | Bedell et al. | |
| 9,570,775 B2 | 2/2017 | Huang et al. | |
| 9,853,287 B2 | 12/2017 | Mikhaylik et al. | |
| 2008/0050656 A1* | 2/2008 | Eisenbeiser | H01M 2/0267 429/241 |
| 2009/0179558 A1 | 7/2009 | Yotsuya | |
| 2009/0208671 A1 | 8/2009 | Nieh et al. | |
| 2010/0104948 A1 | 4/2010 | Skotheim et al. | |
| 2010/0311250 A1 | 12/2010 | Bedell et al. | |
| 2012/0052339 A1 | 3/2012 | Mikhaylik et al. | |
| 2012/0231321 A1 | 9/2012 | Huang et al. | |
| 2012/0237822 A1 | 9/2012 | Futamura et al. | |
| 2013/0065120 A1 | 3/2013 | Miwa et al. | |
| 2013/0309472 A1 | 11/2013 | Halasyamani et al. | |
| 2014/0099544 A1 | 4/2014 | Hosokawa et al. | |
| 2014/0170792 A1 | 6/2014 | Oraw | |
| 2014/0272560 A1 | 9/2014 | Huang et al. | |
| 2014/0363743 A1 | 12/2014 | Stalder et al. | |
| 2015/0004462 A1 | 1/2015 | Huang | |
| 2015/0380576 A1 | 12/2015 | Kayes et al. | |
| 2016/0071797 A1 | 3/2016 | Gan | |
| 2016/0183358 A1 | 6/2016 | Al-Saud et al. | |
| 2016/0284928 A1 | 9/2016 | Bedell et al. | |
| 2016/0351947 A1 | 12/2016 | Kamo et al. | |
| 2017/0194449 A1 | 7/2017 | Bedell et al. | |
| 2018/0006303 A1 | 1/2018 | Mikhaylik et al. | |

FOREIGN PATENT DOCUMENTS

| | | |
|---|---|---|
| CN | 104051773 A | 9/2014 |
| CN | 104137312 A | 11/2014 |
| CN | 206322721 U | 7/2017 |
| JP | 2004-200011 A | 7/2004 |
| JP | 2009295514 A | 12/2009 |
| JP | 2012155974 A | 8/2012 |
| JP | 201773267 A | 4/2017 |
| KR | 10-2013-0129077 A | 11/2013 |
| WO | 2008153564 A1 | 12/2008 |

OTHER PUBLICATIONS

International Search Report and Written Opinion received in International Application No. PCT/IB2018/056915 dated Jan. 21, 2019.
International Search Report and Written Opinion received in International Application No. PCT/IB2018/056916 dated Jan. 21, 2019.
Østreng et al., "High power nano-structured V2O5 thin film cathodes by atomic layer deposition", Journal of Materials Chemistry A, Jul. 2014, pp. 15044-15051, vol. 2, No. 36.
Saha et al., "Single heterojunction solar cells on exfoliated flexible ~25 μm thick mono-crystalline silicon substrates", Applied Physics Letters, Apr. 2013, 5 pages, vol. 102, No. 16, 163904.
Hu et al., "Graphene-modified LiFePO 4 cathode for lithium ion battery beyond theoretical capacity", Nature Communications, Apr. 2013, 7 pages, vol. 4, ncomms2705.
Yoon et al., "GaAs photovoltaics and optoelectronics using releasable multilayer epitaxial assemblies", Nature, May 2010, pp. 329-333, vol. 465, No. 7296.
Shahrjerdi et al., "High-efficiency thin-film InGaP/InGaAs/Ge tandem solar cells enabled by controlled spalling technology", Applied Physics Letters, Feb. 2012, 3 pages, vol. 100, No. 5, 053901.
Bedell et al., "Layer transfer of bulk gallium nitride by controlled spalling", Journal of Applied Physics, Jul. 2017, 6 pages, vol. 122, No. 2, 025103.
Office Action dated Apr. 3, 2019 received in U.S. Appl. No. 15/721,061, Copy Not Enclosed.
Office Action dated Apr. 25, 2019 received in U.S. Appl. No. 15/721,111, Copy Not Enclosed.
International Search Report dated Jan. 9, 2019 received in a corresponding foreign application.
Office Action dated Oct. 7, 2019 received in U.S. Appl. No. 15/721,111, copy not enclosed.

* cited by examiner

HIGH-PERFORMANCE RECHARGEABLE BATTERIES HAVING A SPALLED AND TEXTURED CATHODE LAYER

BACKGROUND

The present application relates to a rechargeable battery and a method of forming the same. More particularly, the present application relates to a high-performance rechargeable battery stack that includes a spalled cathode material layer having at least one textured surface, and methods for forming the same.

A rechargeable battery is a type of electrical battery which can be charged, discharged into a load, and recharged many times, while a non-rechargeable (or so-called primary battery) is supplied fully charged, and discarded once discharged. Rechargeable batteries are produced in many different shapes and sizes, ranging from button cells to megawatt systems connected to stabilize an electrical distribution network.

Rechargeable batteries initially cost more than disposable batteries, but have a much lower total cost of ownership and environmental impact, as rechargeable batteries can be recharged inexpensively many times before they need replacing. Some rechargeable battery types are available in the same sizes and voltages as disposable types, and can be used interchangeably with them. Despite the numerous rechargeable batteries that exist, there is a need for providing rechargeable batteries that have a high-capacity (i.e., a capacity of 50 mAh/gm or greater and exhibit high-performance.

SUMMARY

A high-capacity (i.e., a capacity of 50 mAh/gm or greater) and a high-performance rechargeable battery is provided by forming a rechargeable battery stack that includes a spalled material structure that includes a spalled cathode material layer that has at least one textured surface and a stressor layer that has at least one textured surface. The spalled cathode material layer may include a single crystalline or polycrystalline cathode material. The spalled cathode material layer is typically devoid of polymeric binders. The stressor layer serves as a cathode current collector of the rechargeable battery stack. The at least one textured surface of the spalled cathode material layer forms a large interface area between the cathode and electrolyte which is formed above the spalled cathode material layer. The large interface area between the cathode and the electrolyte reduces interface resistance within the rechargeable battery stack.

In one aspect of the present application, methods of forming such a rechargeable battery stack are provided. In one embodiment, the method may include providing a cathode material substrate having a first textured surface. Next, a stressor layer is formed on the first textured surface of the cathode material substrate. A spalling process is then performed to remove a spalled cathode material layer from the cathode material substrate. The spalled cathode material layer is attached to the stressor layer and includes the first textured surface and a second textured surface opposite the first textured surface.

In another embodiment, the method may include providing a stressor layer on a surface of a cathode material substrate, the stressor layer and the cathode material substrate having non-textured surfaces. Next, a physically exposed surface of the stressor layer is textured. A spalling process is then performed to remove a spalled cathode material layer from the cathode material substrate, wherein the spalled cathode material layer is attached to the stressor layer and includes a textured surface.

In another aspect of the present application, a rechargeable battery stack for use in a rechargeable battery is provided. In one embodiment, the rechargeable battery stack includes a cathode current collector that is composed of a metal stressor material and having at least one textured surface. A spalled cathode material layer having a least one textured surface is located on the cathode current collector. An electrolyte is located on the at least one textured surface of the spalled cathode material layer. An anode is located on the electrolyte, and an anode current collector is located on the anode.

DETAILED DESCRIPTION

Figure 1:
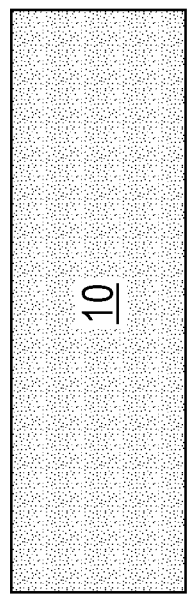
FIG. 1 is a cross sectional view of an exemplary structure of a cathode material substrate that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary structure of a cathode material substrate 10 that can be employed in accordance with an embodiment of the present application. In this embodiment of the present application, the cathode material substrate 10 has a uniform thickness across the entire length of the cathode material substrate 10. Moreover, the topmost surface and the bottommost surface of the cathode material substrate 10 that can be employed are both planar across the entire length of the cathode material substrate 10. Stated in other terms, the cathode material substrate 10 that is initially used in the present application has non-textured (i.e., planar or flat) surfaces. The term "non-textured surface" denotes a surface that is smooth and has a surface roughness on the order of less than 100 nm root mean square as measured by profilometry.

The cathode material substrate 10 that can be employed in one embodiment of the present application may comprise any cathode material of a rechargeable battery whose fracture toughness is less than that of the stressor material to be subsequently described. Fracture toughness is a property which describes the ability of a material containing a crack to resist fracture. Fracture toughness is denoted $K_{Ic}$. The subscript Ic denotes mode I crack opening under a normal tensile stress perpendicular to the crack, and c signifies that it is a critical value. Mode I fracture toughness is typically the most important value because spalling mode fracture usually occurs at a location in the substrate where mode II stress (shearing) is zero, and mode III stress (tearing) is generally absent from the loading conditions. Fracture toughness is a quantitative way of expressing a material's resistance to brittle fracture when a crack is present.

In one embodiment of the present application, the cathode material that provides the cathode material substrate 10 is a lithiated material such as, for example, a lithium-based mixed oxide. Examples of lithium-based mixed oxides that may be employed as the cathode material substrate 10 include, but are not limited to, lithium cobalt oxide ($LiCoO_2$), lithium nickel oxide ($LiNiO_2$), lithium manganese oxide ($LiMn_2O_4$), lithium cobalt manganese oxide ($LiCoMnO_4$), a lithium nickel manganese cobalt oxide ($LiNi_xMn_yCo_zO_2$), lithium vanadium pentoxide ($LiV_2O_5$) or lithium iron phosphate ($LiFePO_4$). In another embodiment, the cathode material that provides the cathode material substrate is not lithiated and can be any solid cathode material that meets the spalling criteria of brittleness and toughness as mentioned above.

In one embodiment, the cathode material substrate 10 is a single crystalline cathode material (i.e., a cathode material in which the crystal lattice of the entire sample is continuous and unbroken to the edges of the sample, with no grain boundaries). A cathode material substrate 10 that is composed of a single crystalline cathode material can be used to provide a cathode material layer of a battery material stack that exhibits fast cathode ion, e.g., Li ion, and electron transport. In another embodiment, the cathode material substrate 10 is a polycrystalline cathode material (i.e., a cathode material that is composed of many crystallites of varying size and orientation). Typically, the cathode material substrate 10 is devoid of any polymer binder material. Polymeric binder free cathodes can provide a battery stack that exhibits robust operation without capacity degradation.

The cathode material substrate 10 may have a thickness greater than 100 μm (microns). Other thicknesses can also be used as the thickness of the cathode material substrate 10.

In some embodiments of the present application, at least the topmost surface of the cathode material substrate 10 can be cleaned prior to further processing to remove surface oxides and/or other contaminants therefrom. In one embodiment of the present application, the cathode material substrate 10 is cleaned by applying a solvent such as, for example, acetone and isopropanol, which is capable of removing contaminates and/or surface oxides from the topmost surface of the cathode material substrate 10.

In some embodiments of the present application, the topmost surface of the cathode material substrate 10 can be made hydrophobic by oxide removal prior to use by dipping the topmost surface of the cathode material substrate 10 into hydrofluoric acid. A hydrophobic, or non-oxide, surface provides improved adhesion between the cleaned surface and certain stressor materials to be deposited.

Figure 2:
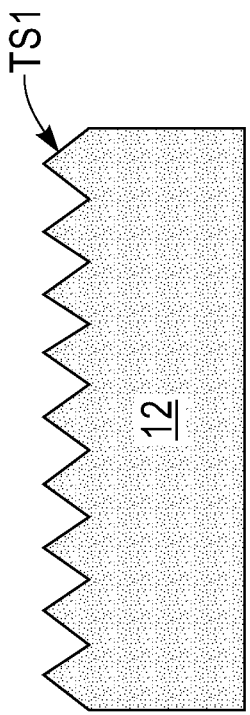
FIG. 2 is a cross sectional view of the exemplary structure of FIG. 1 after patterning a physically exposed surface of the cathode material substrate to provide a textured surface to the cathode material substrate.

Referring now to FIG. 2, there is illustrated the exemplary structure of FIG. 1 after patterning (i.e., texturing) a physically exposed surface (e.g., a topmost surface) of the cathode material substrate 10 to provide a first textured surface, TS1, to the cathode material substrate; the cathode material substrate having the textured surface can be referred to as textured cathode material substrate 12. The surface roughness of the textured cathode material substrate 12 can be in a range from 10 nm root mean square to 50 μm root mean square as also measured by profilometry.

In some embodiments of the present application, patterning (i.e., texturing) can be performed by forming a plurality of etching masks (e.g., metal, insulator, or polymer) on the surface of a non-textured cathode material substrate 10, etching the non-textured cathode material substrate 10 utilizing the plurality of masks as an etch mask, and then removing the etch masks. In some embodiments (and as shown in the drawings), the textured surface, TS1, of the textured cathode material substrate 12 is composed of a plurality of pyramids. In yet another embodiment (not shown), the textured surface, TS1, of the textured cathode material substrate 12 is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the cathode material substrate 10 occurs. Details concerning the use of metallic masks in texturing a surface of a substrate can be found in co-pending and co-assigned U.S. patent application Ser. No. 15/474,434, filed on Mar. 30, 2017, the entire content of which is incorporated herein by reference.

In another embodiment of the present application, patterning (i.e., texturing) can be performed utilizing a grinding process.

Figure 3:
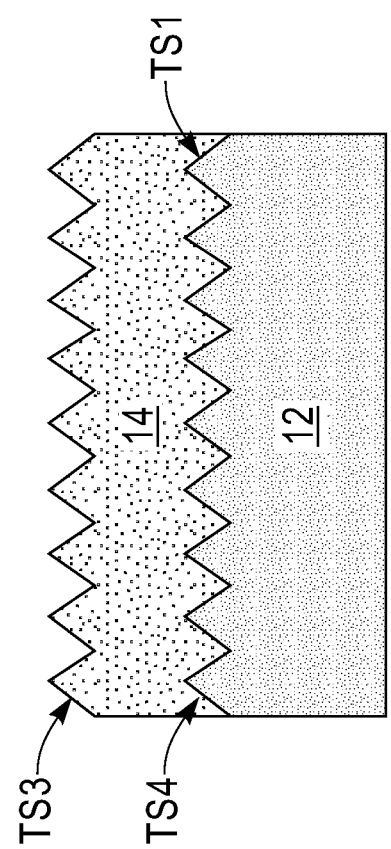
FIG. 3 is a cross sectional view of the exemplary structure of FIG. 2 after forming a stressor layer on the textured surface of the cathode material substrate.

Referring now to FIG. 3, there is illustrated the exemplary structure of FIG. 2 after forming a stressor layer 14 on the textured surface, TS1, of the texture cathode material substrate 12. In accordance with this embodiment of the present application, the stressor layer 14 follows the contour of the textured cathode material substrate 12 and thus the stressor layer 14 has a first textured surface, TS3, and a second textured surface, TS4, which is opposite to the first textured surface, TS3.

The stressor layer 14 that can be employed in the present application includes any cathode-side electrode material that is under tensile stress on textured cathode material substrate 12 at a spalling temperature. As such, the stressor layer 14 can also be referred to herein as a stress-inducing layer; after spalling the stressor layer 14 that is attached to a spalled portion of the cathode material substrate will serve as a cathode current collector (i.e., cathode-side electrode) of a rechargeable battery stack. In accordance with the present application, the stressor layer 14 has a critical thickness and stress value that cause spalling mode fracture to occur within the textured cathode material substrate 12. By "spalling mode fracture" it is meant that a crack is formed within textured cathode material substrate 12 and the combination of loading forces maintain a crack trajectory at a depth below the stressor/substrate interface. By critical condition, it is meant that for a given stressor material and base substrate material combination, a thickness value and a stressor value for the stressor layer is chosen that render spalling mode fracture possible (can produce a $K_I$ value greater than the $K_{IC}$ of the substrate).

The thickness of the stressor layer 14 is chosen to provide the desired fracture depth within the textured cathode material substrate 12. For example, if the stressor layer 14 is chosen to be nickel (Ni), then fracture will occur at a depth below the stressor layer 14 roughly 2 to 3 times the Ni thickness. The stress value for the stressor layer 14 is then chosen to satisfy the critical condition for spalling mode fracture. This can be estimated by inverting the empirical equation given by $t^* = [(2.5 \times 10^6)(K_{IC}^{3/2})]\sigma^2$, where $t^*$ is the critical stressor layer thickness (in microns), $K_{IC}$ is the fracture toughness (in units of MPa·m$^{1/2}$) of the textured cathode material substrate 12 and $\sigma$ is the stress value of the stressor layer (in MPa or megapascals). The above expression is a guide, in practice, spalling can occur at stress or thickness values up to 20% less than that predicted by the above expression.

Illustrative examples of cathode electrode materials that are under tensile stress when applied to the textured cathode material substrate 12 and thus can be used as the stressor layer 14 include, but are not limited to, titanium (Ti), platinum (Pt), nickel (Ni), aluminum (Al) or titanium nitride (TiN). In one example, the stressor layer 14 includes a stack of, from bottom to top, titanium (Ti), platinum (Pt) and titanium (Ti). In one embodiment, the stressor layer 14 consists of Ni.

In one embodiment, the stressor layer 14 employed in the present disclosure can be formed at a first temperature which is at room temperature (15° C.-40° C.). The stressor layer 14 can be formed utilizing a deposition process that is well known to those skilled in the art including, for example, a physical vapor deposition process (e.g., sputtering or evaporation) or an electrochemical deposition process (e.g., electroplating or electroless plating).

In some embodiments of the preset application, the stressor layer 14 has a thickness of from 2 μm to 300 μm. Other thicknesses for the stressor layer 14 that are below and/or above the aforementioned thickness ranges can also be employed in the present disclosure.

In some embodiments of the present application, an adhesion layer can be formed directly on cathode material substrate prior to forming the stressor layer 14. The adhesion layer is employed in embodiments in which the stressor layer to be subsequently formed has poor adhesion to the cathode material that provides the cathode material substrate. In some embodiments (not shown in this embodiment), a corrosion inhibitor layer can be formed directly on the cathode material substrate prior to forming the stressor layer 14. In yet another embodiment (not shown in this embodiment, but shown in FIG. 6B), a stack of, from bottom to top, a corrosion inhibitor layer and an adhesion layer is formed directly on the cathode material substrate prior to forming the stressor layer 14.

Each of the adhesion layer and the corrosion inhibitor layer follows the contour of the underlying cathode material. For example, if the cathode material substrate is textured as shown in FIG. 2, both the adhesion layer and the corrosion inhibitor layer have textured first and second surfaces. If the cathode material substrate is non-textured, as shown in FIG. 6B, both the adhesion layer and the corrosion inhibitor layer have planar surfaces.

The adhesion layer that can be employed in some embodiments of the present application includes any metal adhesion material such as, but not limited to, titanium (Ti), tantalum (Ta), titanium nitride (TiN), tantalum nitride (TaN) or any combination thereof. The adhesion layer may comprise a single layer or it may include a multilayered structure comprising at least two layers of different metal adhesion materials.

The adhesion layer that can be employed in the present application can be formed at room temperature (15° C.-40° C., i.e., 288K to 313K) or above. In one embodiment, the adhesion layer can be formed at a temperature which is from 20° C. (293K) to 180° C. (353K). In another embodiment, the adhesion layer can be formed at a temperature which is from 20° C. (293K) to 60° C. (333K). The adhesion layer, which may be optionally employed, can be formed utilizing a deposition technique such as, for example, sputtering or plating. When sputter deposition is employed, the sputter deposition process may further include an in-situ sputter clean process before the deposition.

When employed, the adhesion layer typically has a thickness from 5 nm to 200 nm, with a thickness from 100 nm to 150 nm being more typical. Other thicknesses for the adhesion layer that are below and/or above the aforementioned thickness ranges can also be employed in the present application.

The corrosion inhibitor layer includes any metal or metal alloy that is electrochemically stable with the cathode current collector (i.e., stressor layer) potential. For example, when Ni is employed as the cathode current collector (i.e., stressor) material, the corrosion inhibitor layer may be composed of aluminum (Al). The corrosion inhibitor layer may comprise a single layer or it may include a multilayered structure comprising at least two layers of corrosion inhibitor materials.

The corrosion inhibitor layer may have a thickness from 2 nm to 400 nm; although other thickness that are lesser than or greater than the aforementioned thickness range may also be employed. The corrosion inhibitor layer can be formed by a deposition process including, for example, chemical vapor deposition (CVD), plasma-enhanced chemical vapor deposition (PECVD), atomic layer deposition (ALD), or physical vapor deposition (PVD) techniques that may include evaporation and/or sputtering. The corrosion inhibitor layer may be formed within temperatures ranges mentioned above for the adhesion layer.

In accordance with the present application, the adhesion layer and/or the corrosion inhibitor layer is (are) formed at a temperature which does not effectuate spontaneous spalling to occur within the cathode material substrate (textured or non-textured). By "spontaneous" it is meant that the removal of a thin material layer from a substrate occurs without the need to employ any manual means to initiate crack formation and propagation for breaking apart the thin material layer from the base substrate. By "manual" it is meant that crack formation and propagation are explicit for breaking apart the thin material layer from the substrate.

In some embodiments (not shown in this embodiment, but shown in FIG. 7), a handle substrate can be attached to a physically exposed surface of the stressor layer prior to spalling. The handle substrate may include any flexible material which has a minimum radius of curvature that is typically less than 30 cm. Illustrative examples of flexible materials that can be employed as the handle substrate include a polymeric tape, a metal foil or a polyimide foil. The handle substrate can be used to provide better fracture control and more versatility in handling the spalled portion of the cathode material substrate. Moreover, the handle substrate can be used to guide the crack propagation during spalling. The handle substrate is typically, but not necessarily, formed at a first temperature which is at room temperature (15° C.-40° C.).

The handle substrate typical has a thickness of from 1 μm to few mm, with a thickness of from 70 μm to 120 μm being more typical. Other thicknesses for the handle substrate that are below and/or above the aforementioned thickness ranges can also be employed in the present disclosure. In some embodiments, the handle substrate can be employed to the attached to the physically exposed surface of the stressor layer utilizing an adhesive material.

Figure 4:
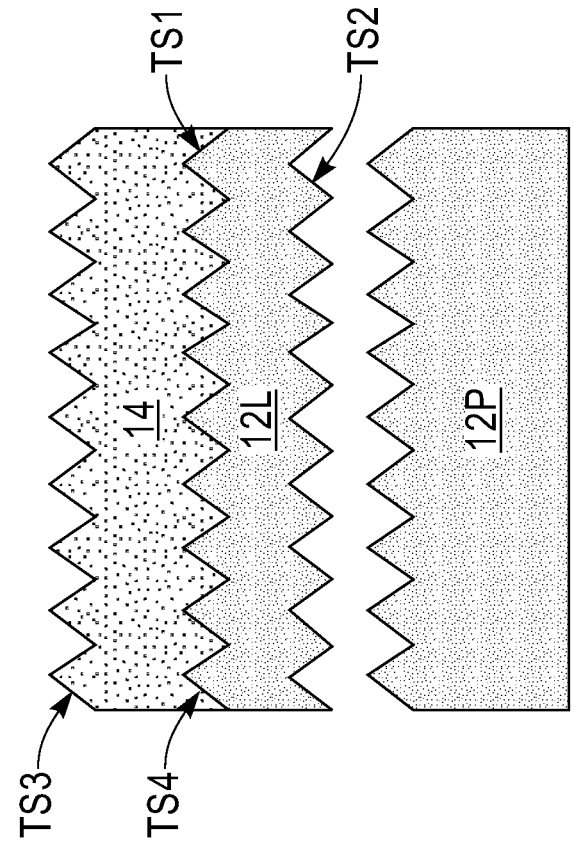
FIG. 4 is a cross sectional view of the exemplary structure of FIG. 3 after performing a spalling process.

Referring now to FIG. 4, there is illustrated the exemplary structure of FIG. 3 after performing a spontaneous spalling process (hereinafter just "spalling:"). Spalling is a controlled and scalable surface layer removal process in which a thin layer of a material is removed from a base substrate without utilizing an etching process or mechanical means. The spalling process transfers the original textured surfaces into a spalled surface of the material that is removed from the base substrate. By thin, it is meant that the removed layer thickness is typically less than 200 μm. In some embodiments, the spalled cathode material layer of the present application can have a thickness that is greater than 5 μm and less than 50 μm. In other embodiments, the spalled cathode material layer of the present application can have a thickness that is greater than 5 μm and less than 100 μm. In some embodiments, the spalled cathode material layer can have a thickness of less than 5 μm. In some embodiments, the controlled spalling process of the present application may be aided by pulling the handle substrate away from structure including the cathode material substrate and the stressor layer.

In the present application, the spalling process removes a portion of the cathode material from the cathode material substrate. The removed portion of the cathode material, which is still attached to the stressor layer, is referred to herein as spalled cathode material layer. The spalled cathode material layer contains at least one textured surface. The remaining portion of the textured cathode material substrate 12, which is no longer attached to the stressor layer, is referred to herein as a cathode material substrate portion. The cathode material substrate portion can be reused in other applications. The spalled cathode material layer and the attached stressor layer (an optionally the adhesion layer and/or the optional corrosion inhibitor layer) may be referred to herein as a spalled material layer structure.

In the embodiment illustrated in FIG. 4, the spalled cathode material layer is designated as element 12L, while the remaining cathode material substrate portion is designated as element 12P. In the embodiment illustrated in FIG. 4, the spalled cathode material layer 12L has a first textured surface, TS1, and a second textured surface, TS2, that is opposite to the first textured surface, TS1, the cathode material substrate portion 12P also has a textured topmost surface. In this embodiment, the spalled material layer structure includes a spalled cathode material layer 12L containing textured surfaces TS1 and TS2, and a stressor layer 14 containing textured surfaces, TS3 and TS4. The interface between the spalled cathode material layer 12L and the stressor layer 14 is textured in this embodiment of the present application.

Spalling can be initiated at room temperature or at a temperature that is less than room temperature. In one embodiment, spalling is performed at room temperature (i.e., 20° C. to 40° C.). In another embodiment, spalling is performed at a temperature less than 20° C. In a further embodiment, spalling occurs at a temperature of 77 K or less. In an even further embodiment, spalling occurs at a temperature of less than 206 K. In still yet another embodiment, spalling occurs at a temperature from 175 K to 130 K. When a temperature that is less than room temperature is used, the less than room temperature spalling process can be achieved by cooling the structure down below room temperature utilizing any cooling means. For example, cooling can be achieved by placing the structure in a liquid nitrogen bath, a liquid helium bath, an ice bath, a dry ice bath, a supercritical fluid bath, or any cryogenic environment liquid or gas.

When spalling is performed at a temperature that is below room temperature, the spalled structure is returned to room temperature by allowing the spalled structure to slowly warm up to room temperature by allowing the same to stand at room temperature. Alternatively, the spalled structure can be heated up to room temperature utilizing any heating means. After spalling, the handle substrate can be removed from the spalled material layer structure. The handle substrate can be removed from the spalled material layer structure utilizing conventional techniques well known to those skilled in the art. For example, UV or heat treatment can be used to remove the handle substrate.

Figure 5B:
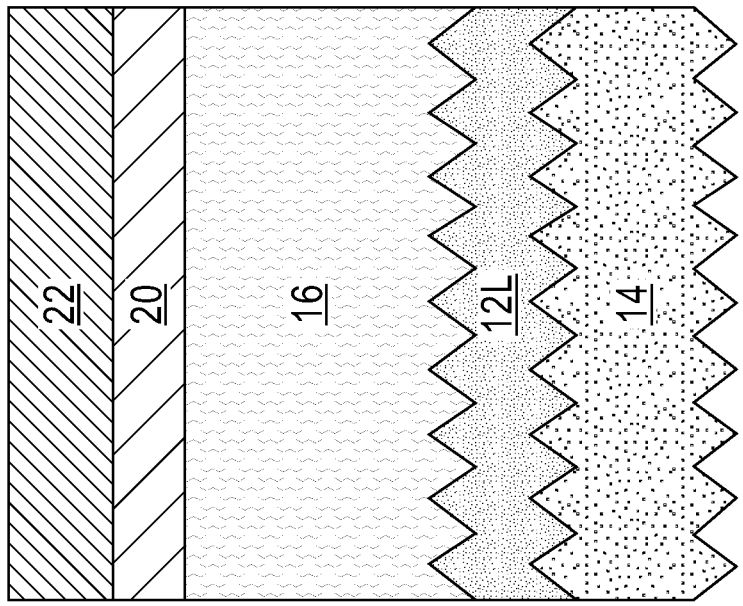
FIG. 5B is a cross sectional view of another rechargeable battery stack which includes a spalled cathode material layer and the stressor layer of the exemplary structure shown in FIG. 4.
Figure 5A:
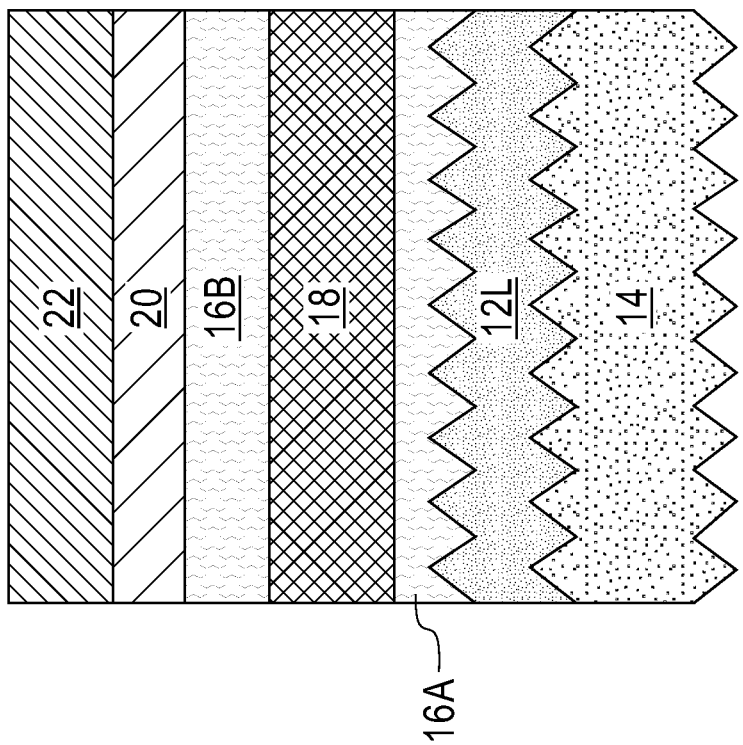
FIG. 5A is a cross sectional view of a rechargeable battery stack which includes a spalled cathode material layer and the stressor layer of the exemplary structure shown in FIG. 4.

Referring now to FIGS. 5A and 5B, there are shown various rechargeable battery stacks which include the spalled material structure (12L/14) shown in FIG. 4. Notably, the rechargeable battery stack shown in FIG. 5A includes a stressor layer 14 having textured first and second surfaces (TS3 and TS4) as the cathode current collector (i.e., cathode-side electrode), a spalled cathode material layer 12L having the textured first and second surfaces (TS1 and TS2), a first region 16A of an electrolyte, a separator 18, a second region 16B of an electrolyte, an anode 20 and an anode current collector 22 (i.e., anode-side electrode). The rechargeable battery stack shown in FIG. 5B is similar to the one shown in FIG. 5A except that a single region 16 of electrolyte is present; no separator is used in the rechargeable battery shown in FIG. 5B. As is shown in FIGS. 5A and 5B, the bottommost surface of the electrolyte, which forms an interface with the spalled cathode material layer 12L, follows the contour of the textured surface of the spalled cathode material layer 12L.

In providing the rechargeable battery stacks shown in FIGS. 5A-5B, the spalled material structure (12L,14) shown in FIG. 4 is flipped such that the stressor layer 14 is located beneath the spalled cathode material layer 12L and then the other components of the rechargeable battery stacks are formed one atop the other above the spalled cathode material layer 12L.

The electrolyte that can be used in the present application may include any conventional electrolyte that can be used in a rechargeable battery. The electrolyte may be a liquid electrolyte, a solid-state electrolyte or a gel type electrolyte. In some embodiments, the solid-state electrolyte may be a polymer based material or an inorganic material. In other embodiments, the electrolyte is a solid-state electrolyte that includes a material that enables the conduction of lithium ions. Such materials may be electrically insulating or ionic conducting. Examples of materials that can be employed as the solid-state electrolyte include, but are not limited to, lithium phosphorus oxynitride (LiPON) or lithium phosphosilicate oxynitride (LiSiPON).

In embodiments in which a solid-state electrolyte layer is employed, the solid-state electrolyte may be formed utilizing a deposition process such as, sputtering, solution deposition or plating. In one embodiment, the solid-state electrolyte is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The separator 18, which is used in cases in which a liquid electrolyte is used, may include one or more of a flexible porous material, a gel, or a sheet that is composed of cellulose, cellophane, polyvinyl acetate (PVA), PVA/cellulous blends, polyethylene (PE), polypropylene (PP) or a mixture of PE and PP. The separator 18 may also be composed of inorganic insulating nano/microparticles.

The anode 20 may include any conventional anode material that is found in a rechargeable battery. In some embodiments, the anode 20 is composed of a lithium metal, a lithium-base alloy such as, for example, $Li_xSi$, or a lithium-based mixed oxide such as, for example, lithium titanium oxide ($Li_2TiO_3$). The anode 20 may also be composed of Si, graphite, or amorphous carbon.

In some embodiments, the anode 20 is formed prior to performing a charging/recharging process. In such an embodiment, the anode 20 can be formed utilizing a deposition process such as, for example, chemical vapor deposition (CVD), plasma enhanced chemical vapor deposition (PECVD), evaporation, sputtering or plating. In some embodiments, the anode 20 is a lithium accumulation region that is formed during a charging/recharging process. The anode 20 may have a thickness from 20 nm to 200 µm.

The anode current collector 22 (i.e., anode-side electrode) may include any metallic electrode material such as, for example, titanium (Ti), platinum (Pt), nickel (Ni), copper (Cu) or titanium nitride (TiN). In one example, the anode current collector 22 includes a stack of, from bottom to top, nickel (Ni) and copper (Cu). In one embodiment, the metallic electrode material that provides the anode current collector 22 may be the same as the metallic electrode material that provides the cathode current collector (i.e., stressor layer 14). In another embodiment, the metallic electrode material that provides the anode current collector 22 may be different from the metallic electrode material that provides the cathode current collector The anode current collector 22 may be formed utilizing a deposition process such as, for example, chemical vapor deposition, sputtering or plating. The anode current collector may have a thickness from 100 nm to 200 µm.

Figure 6A:
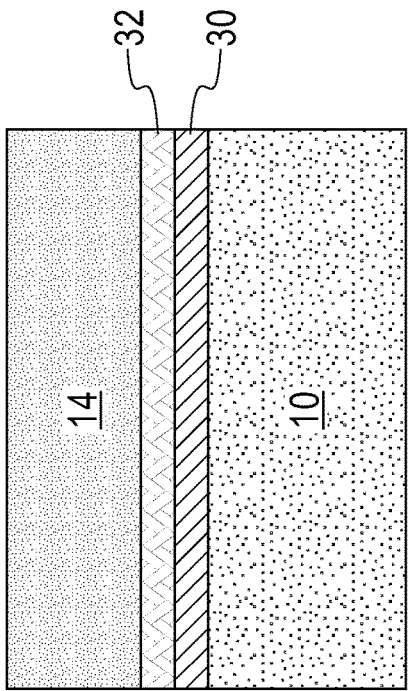
FIG. 6A is a cross sectional view of the exemplary structure including, from bottom to top, a cathode material substrate and a stressor layer that can be employed in another embodiment of the present application.
Figure 6B:
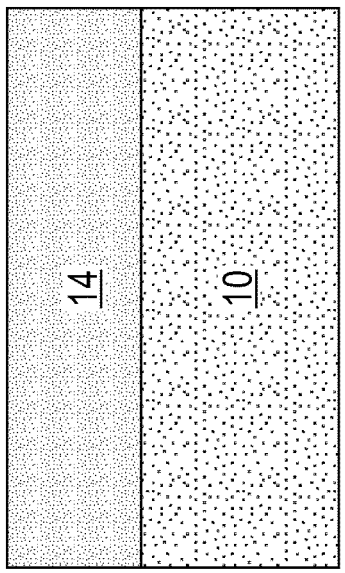
FIG. 6B is a cross sectional view of the exemplary structure including, from bottom to top, a cathode material substrate, a corrosion inhibitor layer, an adhesion layer, and a stressor layer that can be employed in another embodiment of the present application.

Referring now to FIGS. 6A-6B, there are illustrated other exemplary structures that can be used in providing a spalled material structure that can be used in providing a rechargeable battery stack. Notably, FIG. 6A illustrates an exemplary structure that includes, from bottom to top, a cathode material substrate 10 and a stressor layer 14, while FIG. 6B illustrates an exemplary structure that includes, from bottom to top, a cathode material substrate 10, an adhesion layer 30, a corrosion inhibitor layer 32, and a stressor layer 14.

In the exemplary structures shown in FIG. 6A-6B, no texturing of the cathode material substrate 10 is performed prior to stressor layer 14 formation. Instead, the cathode material substrate 10 is non-textured and it has planar surfaces. Also, the stressor layer 14 shown in FIGS. 6A-6B as well as the adhesion layer 30, and the corrosion inhibitor layer 32 of FIG. 6B have planar surfaces.

The cathode material substrate 10, stressor layer 14, adhesion layer 30, and the corrosion inhibitor layer 32 of the embodiments illustrated in FIGS. 6A-6B have been previously described above in regard to the embodiment shown in FIGS. 1-4 of the present application.

Figure 7:
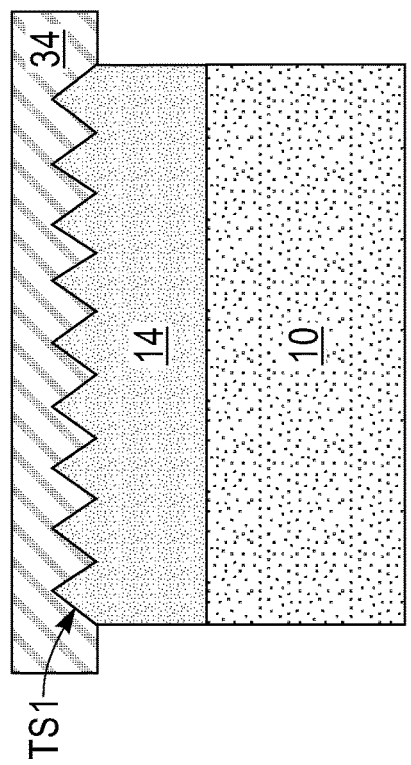
FIG. 7 is a cross sectional view of the exemplary structure of FIG. 6A after patterning a physically exposed surface of the stressor layer to provide a textured surface to the stressor layer.

Referring now to FIG. 7, there illustrated the exemplary structure of FIG. 6A after patterning (i.e., texturing) a physically exposed (i.e., topmost) surface of the stressor layer 14 to provide a textured surface, TS1, to the stressor layer 14. The surface roughness of the textured stressor layer 14 can be in a range from 100 nm root mean square to 100 µm root mean square as also measured by profilometry. While patterning of the stressor layer 14 is shown for the exemplary structure illustrated in FIG. 6A, patterning of the stressor layer 14 shown for the exemplary structure illustrated in FIG. 6B may also be performed.

In some embodiments of the present application, patterning (i.e., texturing) can be performed by forming a plurality of etching masks (e.g., metal, insulator, or polymer) on the surface of a non-textured stressor layer 14, etching the non-textured stressor layer 14 utilizing the plurality of masks as an etch mask, and then removing the etch masks. In some embodiments (and as shown in the drawings), the textured surface, TS1, of the textured stressor layer 14 is composed of a plurality of pyramids. In yet another embodiment (not shown), the textured surface, TS1, of the textured stressor layer 14 is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the stressor layer 14 occurs. Details concerning the use of metallic masks in texturing a surface of a substrate can be found in co-pending and co-assigned U.S. patent application Ser. No. 15/474,434, filed on Mar. 30, 2017, the entire content of which is incorporated herein by reference.

In another embodiment of the present application, patterning (i.e., texturing) can be performed utilizing a grinding process.

In some embodiments, and as shown in FIG. 7, a handle substrate 34, as described above, can be attached to the stressor layer 14 prior to spalling.

Figure 8:
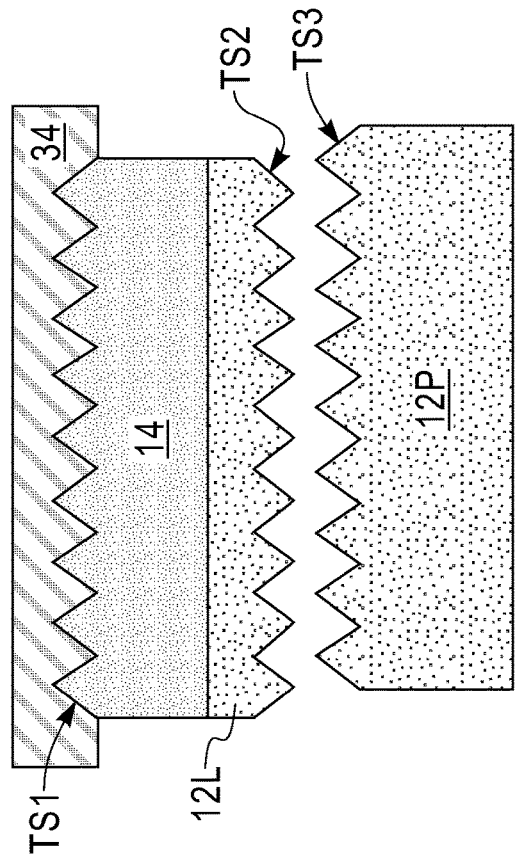
FIG. 8 is a cross sectional view of the exemplary structure of FIG. 7 after performing a spalling process.

Referring now to FIG. 8, there is illustrated the exemplary structure of FIG. 7 after performing a spontaneous spalling process. Spalling is performed as defined above.

In the embodiment illustrated in FIG. 8, the spalled cathode material layer is designated as element 12L, while the remaining cathode material substrate portion is designated as element 12P. In the embodiment illustrated in FIG. 8, the spalled cathode material layer 12L has a textured surface, TS2; the cathode material substrate portion also has a textured surface, T3. In this embodiment, the spalled material layer structure includes a spalled cathode material layer 12L containing a textured surface, TS2, and a stressor layer 14 containing a textured surface, TS1. The interface between the spalled cathode material layer 12L and the stressor layer 14 is planar (i.e., non-textured) in this embodiment of the present application.

After spalling, and as mentioned above, the handle substrate 34 can be removed from the spalled material structure.

Figure 9A:
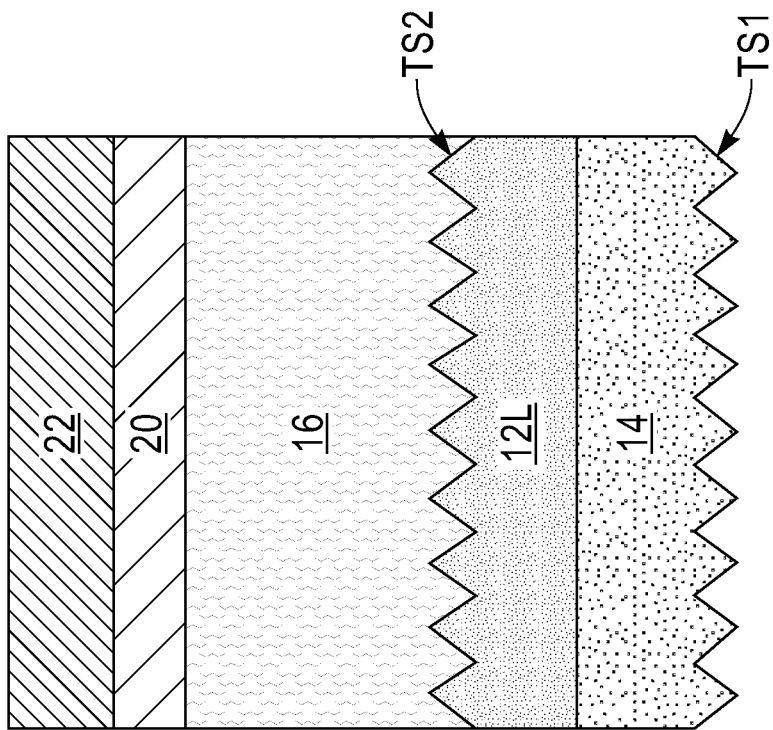
FIG. 9A is a cross sectional view of a rechargeable battery stack which includes a spalled cathode material layer and the stressor layer of the exemplary structure shown in FIG. 8.
Figure 9B:
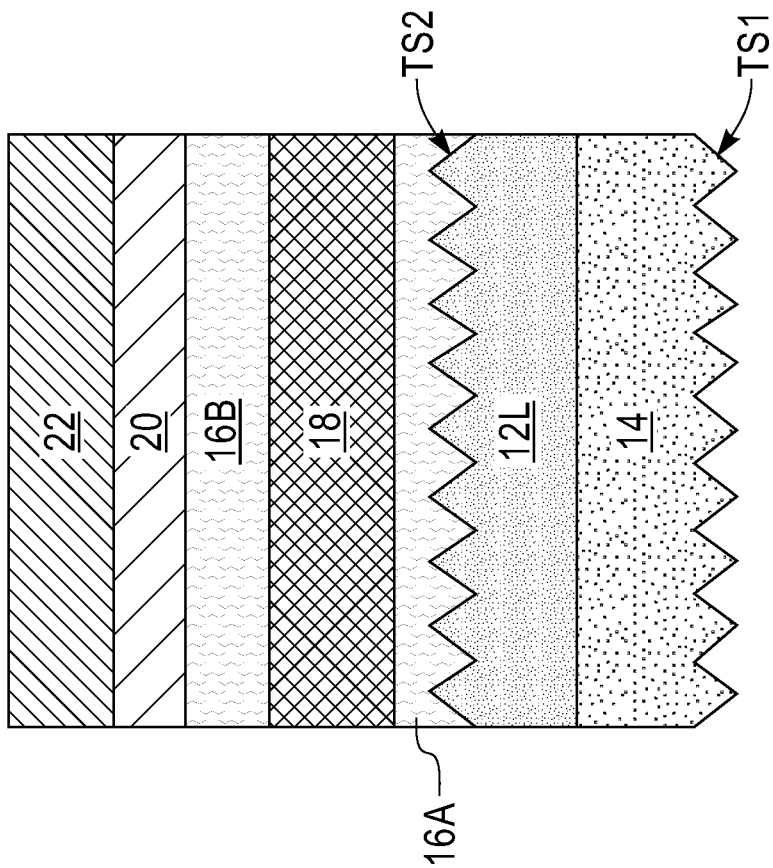
FIG. 9B is a cross sectional view of another rechargeable battery stack which includes a spalled cathode material layer and the stressor layer of the exemplary structure shown in FIG. 8.

Referring now to FIGS. 9A and 9B, there are shown various rechargeable battery stacks which include the spalled material structure (12L/14) shown in FIG. 8. Notably, the rechargeable battery stack shown in FIG. 9A includes a stressor layer 14 having a textured bottommost surface, TS1, as the cathode current collector (i.e., cathode-side electrode), a spalled cathode material layer 12L having a textured topmost surface, TS2, a first region 16A of an electrolyte, a separator 18, a second region 16B of an electrolyte, an anode 20 and an anode current collector 22 (i.e., anode-side electrode). The rechargeable battery stack shown in FIG. 9B is similar to the one shown in FIG. 9A except that a single region 16 of electrolyte is present; no separator is used in the rechargeable battery shown in FIG. 9B. The electrolyte, separator 18, anode 20 and anode current collector 22 (i.e., anode-side electrode) illustrated in used in providing the rechargeable battery stack shown in FIGS. 9A and 9B are the same as defined above in the providing the rechargeable battery stack shown in FIGS. 6A and 6B. As is the previous embodiment of the present application, the bottommost surface of the electrolyte, which forms and interface with the spalled cathode material layer 12L, follows the contour of the textured surface of the spalled cathode material layer 12L.

In providing the rechargeable battery stacks shown in FIGS. 9A-9B, the spalled material structure (12L/14) shown in FIG. 8 is flipped such that the stressor layer 14 is located beneath the spalled cathode material layer 12L and then the other components of the rechargeable battery stacks are formed one atop the other above the spalled cathode material layer 12L utilizing the techniques and materials mentioned above for providing the rechargeable battery stacks shown in FIGS. 5A-5B.

It is noted that the rechargeable battery stacks of the present application, as shown, for example, in FIGS. 5A, 5B, 9A and 9B exhibit high-capacity, as defined above, and high-performance. Also, the rechargeable battery stacks of the present application have reduced interface resistance due to the texturing that is present in the spalled cathode material layer. Notably, a large area is provided between the spalled cathode material layer and the electrode.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A method of forming a rechargeable battery stack, the method comprising:
   providing a cathode material substrate having a first textured surface and a non-textured surface opposite the first textured surface of the cathode material substrate;
   forming a stressor layer on the first textured surface of the cathode material substrate, wherein the stressor layer has a textured bottom surface and a textured top surface; and
   performing a spalling process to remove a spalled cathode material layer from the cathode material substrate, wherein the spalled cathode material layer is attached to the stressor layer and includes the first textured surface and a second textured surface that is opposite the first textured surface and wherein the spalling process comprises forming a crack in the cathode material substrate at a located between the first textured surface of the cathode material substrate and the non-textured surface of the cathode material substrate, and fracturing the cathode material substrate at the crack.

2. The method of claim 1, further comprising forming an electrolyte and an anode current collector above the second textured surface of the spalled cathode material layer.

3. The method of claim 2, further comprising forming an anode between the electrolyte and the anode current collector, wherein forming the anode comprises deposition or charging/recharging.

4. The method of claim 2, wherein the electrolyte is in a liquid state and wherein a separator is formed separating a first region of the electrolyte from a second region of the electrolyte.

5. The method of claim 2, wherein the electrolyte is in a solid-state, a liquid state or a gel state, and is conformal with the spalled cathode material layer.

6. The method of claim 1, wherein the cathode material substrate is composed of a single crystalline cathode material or a polycrystalline cathode material.

7. The method of claim 1, wherein the stressor layer is a metal which serves as a cathode current collector of the battery material stack, and the stressor layer has a first textured surface and a second textured surface that is opposite the first textured surface.

8. A method of forming a rechargeable battery stack, the method comprising:
   providing a stressor layer on a cathode material substrate, wherein the stressor layer and the cathode material substrate both having a non-textured bottom surface and a non-textured top surface that is opposite the non-textured bottom surface;
   texturing, after the providing the stressor layer on the cathode material substrate, the non-textured top surface of the stressor layer; and performing a spalling process to remove a spalled cathode material layer from the cathode material substrate, wherein the spalled cathode material layer has a textured surface and a non-textured surface that is opposite the textured surface, the non-textured surface of the spalled cathode material layer is attached to the non-textured bottom surface of the stressor layer and wherein the spalling process comprises forming a crack in the cathode material substrate at a located between the non-textured bottom surface of the cathode material substrate and the non-textured top surface of the cathode material substrate, and fracturing the cathode material substrate at the crack.

9. The method of claim 8, further comprising forming an electrolyte and an anode current collector above the textured surface of the spalled cathode material layer.

10. The method of claim 9, further comprising forming an anode between the electrolyte and the anode current collector, wherein forming the anode comprises deposition or charging/recharging.

11. The method of claim 9, wherein the electrolyte is in a liquid state and wherein a separator is formed separating a first region of the electrolyte from a second region of the electrolyte.

12. The method of claim 9, wherein the electrolyte is in a solid-state, a liquid state or a gel state, and is conformal with the spalled cathode material layer.

13. The method of claim 8, wherein the cathode material substrate is composed of a single crystalline cathode material or a polycrystalline cathode material.

14. The method of claim 8, wherein the stressor layer is a metal which serves as a cathode current collector of the battery material stack.

15. A rechargeable battery stack comprising:
a cathode current collector that is composed of a metal stressor material and having a textured bottom surface and an entirely non-textured top surface that is opposite the textured bottom surface;
a spalled cathode material layer having a top textured surface and and an entirely non-textured bottom surface opposite the top textured surface of the spalled cathode material layer, wherein the non-textured bottom surface of the spalled cathode material layer forms an interface with the non-textured top surface of the cathode current collector;
an electrolyte located on the textured top surface of the spalled cathode material layer;
an anode located on the electrolyte; and
an anode current collector located on the anode.

16. The rechargeable battery stack of claim 15, wherein the electrolyte is in a liquid state and wherein a separator is present that separates a first region of the electrolyte from a second region of the electrolyte.

17. The rechargeable battery stack of claim 15, wherein the spalled cathode material layer is composed of a single crystalline cathode material.

18. The rechargeable battery stack of claim 15, wherein the spalled cathode material layer is composed of a polycrystalline crystalline cathode material.

19. The rechargeable battery stack of claim 15, wherein an interface between the cathode current collector and the spalled cathode material is entirely planar.

20. The rechargeable battery stack of claim 15, wherein the spalled cathode material layer has a thickness of greater than 5 µm and less than 100 µm.

21. The rechargeable battery stack of claim 15, wherein the spalled cathode material layer is composed of a material that is devoid of any polymeric binder material.

* * * * *